(12) United States Patent
Nentwig et al.

(10) Patent No.: US 8,498,227 B2
(45) Date of Patent: Jul. 30, 2013

(54) METHOD AND APPARATUS FOR FLEXIBLE SPECTRUM USAGE IN COMMUNICATIONS SYSTEMS

(75) Inventors: Markus Nentwig, Helsinki (FI); Pekka Jänis, Espoo (FI)

(73) Assignee: Nokia Corporation, Espoo (FI)

( * ) Notice: Subject to any disclaimer, the term of this patent is extended or adjusted under 35 U.S.C. 154(b) by 249 days.

(21) Appl. No.: 13/000,294

(22) PCT Filed: Jun. 20, 2008

(86) PCT No.: PCT/IB2008/052438
§ 371 (c)(1),
(2), (4) Date: Dec. 20, 2010

(87) PCT Pub. No.: WO2009/153622
PCT Pub. Date: Dec. 23, 2009

(65) Prior Publication Data
US 2011/0096703 A1    Apr. 28, 2011

(51) Int. Cl.
*H04L 5/14* (2006.01)
(52) U.S. Cl.
USPC .......................................... 370/294; 370/337
(58) Field of Classification Search
USPC .................................................. 370/294, 337
See application file for complete search history.

(56) References Cited

U.S. PATENT DOCUMENTS

| | | | | |
|---|---|---|---|---|
| 6,353,598 B1 * | 3/2002 | Baden et al. | | 370/280 |
| 6,411,612 B1 * | 6/2002 | Halford et al. | | 370/347 |
| 6,434,128 B1 * | 8/2002 | Benz et al. | | 370/329 |

FOREIGN PATENT DOCUMENTS

| | | |
|---|---|---|
| EP | 0979017 A1 | 2/2000 |
| WO | 2004059862 A1 | 7/2004 |

OTHER PUBLICATIONS

International Search Report and Written Opinion of the International Searching Authority for PCT Application No. PCT/IB2008/052438, dated Feb. 23, 2009, 12 pages.

* cited by examiner

*Primary Examiner* — Hassan Kizou
*Assistant Examiner* — Hashim Bhatti
(74) *Attorney, Agent, or Firm* — Locke Lord LLP

(57) ABSTRACT

Methods and apparatuses are disclosed that provide flexible use of a shared radio resource. An apparatus determines from monitoring signal energy on a shared radio resource whether other transmitters are present. A predetermined set of time division duplex (TDD) signaling patterns are identified. A correlation is performed between signal energy received on the shared radio resource and the predetermined TDD signaling patterns. The apparatus may then determine a TDD signaling pattern that may reduce or avoid interference with any other transmitters using the shared resource. The shared radio resource may be, for example, a shared frequency spectrum. Efficient allocation of radio resources among apparatuses such as radio transceivers, without fixed time references or predetermined patterns, may be obtained. The radio transceivers may be base stations or mobile user equipment in a wireless communications system. The apparatus may be an integrated circuit, a portion thereof, or chipset.

20 Claims, 12 Drawing Sheets

METHOD AND APPARATUS FOR FLEXIBLE SPECTRUM USAGE IN COMMUNICATIONS SYSTEMS

RELATED APPLICATION

This application was originally filed as PCT Application No. PCT/IB2008/052438 filed Jun. 20, 2008.

TECHNICAL FIELD

The present invention relates generally to a system and method for flexible use of radio resources in a radio frequency wireless communications system.

BACKGROUND

As wireless communication systems such as cellular, satellite, and microwave communication systems become widely deployed and continue to attract a growing number of users, there is a continuing need to accommodate a large and variable number of communication subsystems transmitting a growing volume of data.

In many communication systems, frequency spectrum in wireless systems is divided by government or regulatory agencies to different frequency bands. These frequency bands may be assigned to certain operators or carriers. This arrangement may be used to minimize interference between different operators. However, the increasing need for additional bandwidth conflicts with the present fixed spectrum assignment approach. The fixed spectrum allocations do not adapt to actual usage, so if there is low use of part of the spectrum in an environment, the operators are not able to efficiently adapt the system usage to take advantage of that spectrum. Further, nonidealities of radio transmitters cause emission of unwanted distortion products in adjacent frequency channels. These unwanted out of band emissions may effectively deny access to those adjacent channels in addition to the frequency channel used for the transmission. However, since the power of such distortion products in adjacent channels is much lower than that of the communication signal in the main channel, the geographical area where access is denied on the adjacent channels (interference radius) is much smaller than the interference radius on the main channel. Whereas a conventional fixed network planning needs to leave a sufficient margin for the worst case that is contemplated, a system using "flexible spectrum usage" can possibly exploit such radio resources that are only available in a limited area, thereby achieving higher capacity for the overall radio system.

Present applications for communications in a wireless system are expanding the need for bandwidth, and hence, frequency spectrum. In addition to the moderate bandwidth requirements of voice communications from and to wireless telephones, the applications now supported include video, audio, and data exchanges that are much more demanding. Video streams sent to mobile devices such as PDAs, viewers, and cellphones require much more bandwidth than traditional voice communications. Further, often the communications are asymmetric; for example, a streaming video broadcast to many viewers over a radio frequency communications system may require much more downlink bandwidth (from a central base station to the users' receivers) than uplink bandwidth, so the spectrum usage needs to be allocated in a manner that reflects real time considerations.

In certain environments, additional bandwidth is frequently needed. In an apartment complex, office park, hospital or university, or in a densely populated urban neighborhood, the number of radio transceivers in a given area may be much denser than in a typical residential or rural area. These environments require additional flexibility. More radio capacity could be added by merely providing power, a network connection and an antenna to an additional base station. This might be considered analogous to adding a wireless LAN "hotspot" for internet access by computer users. However, in present wireless communications systems, adding additional base stations requires that the new equipment be in communication with a managing network, and that certain common reference parameters such as common timing references be known to the new base station and to neighboring base stations. Further the base stations using a particular frequency spectrum must be operated by a common operator so that the timing references used are known and understood amongst the base stations.

Presently, work is progressing on advancing the standards for wireless communications systems to support present and future enhanced services, such as providing capacity to replace wired telephony systems, support for video, audio or data (for example, software updates) broadcasts simultaneously to many users, support for data file communications, and support for internet services over an air interface, as well as support for existing voice, email, text, photographs, and SMS messaging services. The group of standards presently in development comprises the International Mobile Telecommunications ("IMT") Advanced ("IMT-A") project and the 3G long term evolution project, for example.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as Voice over Internet Protocol ("VoIP") and Multimedia Broadcast/Multicast Services ("MBMS"). MBMS may support services where base stations transmit to multiple user equipment simultaneously such as mobile television or radio broadcasts, for example. The 3GPP LTE project is not itself a standard-generating effort, but will result in new recommendations for standards for the UMTS.

The wireless communication systems as described herein are applicable to, for instance, IMT-A and 3GPP LTE compatible wireless communication systems and of interest is an aspect of LTE referred to as "evolved UMTS Terrestrial Radio Access Network," or e-UTRAN. In general, e-UTRAN resources are assigned more or less temporarily by the network to one or more UEs by use of allocation tables, or more generally by use of a downlink resource assignment channel or physical downlink control channel (PDCCH). LTE is a packet-based system and, therefore, there may not be a dedicated connection reserved for communication between a UE and the network. Users are generally scheduled on a shared channel every transmission time interval (TTI) by a Node B or an evolved Node B (e-Node B). A Node B or an e-Node B controls the communications between user equipment terminals in a cell served by the Node B or e-Node B. In general, one Node B or e-Node B serves each cell. A Node B may be referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz (MHz), and at least 400 users for a higher spectrum allocation.

The UTRAN comprises multiple Radio Network Subsystems (RNSs), each of which contains at least one Radio Network Controller (RNC). However, it should be noted that the RNC may not be present in the actual implemented systems incorporating E-UTRAN. LTE may include a centralized or decentralized entity for control information. In UTRAN operation, each RNC may be connected to multiple Node Bs which are the UMTS counterparts to Global System for Mobile Communications (GSM) base stations. In E-UTRAN systems, the e-Node B may be, or is, connected directly to the access gateway ("aGW," sometimes referred to as the services gateway "sGW"). Each Node B may be in radio contact with multiple UEs (generally, user equipment including mobile transceivers or cellphones, although other devices such as fixed cellular phones, mobile web browsers, laptops, PDAs, MP3 players, and gaming devices with transceivers may also be UEs) via the radio over the air or Uu interface.

In order to facilitate scheduling on the shared channel, the e-Node B transmits a resource allocation to a particular UE in a downlink-shared channel (PDCCH) to the UE. The allocation information may be related to both uplink and downlink channels. The allocation information may include information about which resource blocks in the frequency domain are allocated to the scheduled user(s), the modulation and coding schemes to use, what the size of the transport block is, and the like.

The lowest level of communication in the E-UTRAN system, Level 1, is implemented by the Physical Layer ("PHY") in the UE and in the e-Node B. The PHY performs the physical transport of the packets between them over the air interface using radio frequency signals. In order to ensure a transmitted packet was received, an automatic retransmit request ("ARQ") and a hybrid automatic retransmit request ("HARQ") approach is provided. Thus, whenever the UE receives packets through one of several downlink channels, including command channels and shared channels, the UE performs a communications error check on the received packets, typically a Cyclic Redundancy Check (CRC), and in a later sub frame following the reception of the packets, transmits a response on the uplink to the e-Node B or base station. The response is either an Acknowledged (ACK) or a Not Acknowledged (NACK) message. If the response is a NACK, the e-Node B automatically retransmits the packets in a later sub frame on the downlink or DL. In the same manner, any UL transmission from the UE to the e-Node B is responded to, at a specific sub frame later in time, by a NACK/ACK message on the DL channel to complete the HARQ. In this manner, the packet communications system remains robust with a low latency time and fast turnaround time.

Current systems require a network communications system to allow base stations to coordinate with one another. Base stations sharing frequency spectrum typically use a common timing reference. Fixed frequency allocations controlled by a central agency ensure operators do not interfere with each other. However, these allocations may create underused and unused frequency spectrum.

A flexible spectrum usage (FSU) approach is envisioned as one solution to increasing the efficient use of frequency spectrum in evolving 3GPP LTE and IMT-A systems. In this approach, frequency spectrum may not be exclusively allocated in bands. These future systems will not rely on the fixed network planning and hardwired network backbone of the present approaches; instead, it is believed that these systems will use frequency spectrum in a manner that makes efficient allocations in real time or near real time, using agreed fairness protocols to share the spectrum between actors.

Wireless communications systems have an ongoing need for the capability to add additional bandwidth capacity or coverage in a manner similar to a wireless LAN hotspot approach, that is, by simply providing power and a network connection for another base station. In order to maintain the capability to support multiple operators and to provide simple hardware compatibility, additional capacity should be added without the requirement that the added equipment be in communication with a particular operator or other base stations in the geographic vicinity; instead, an ongoing need exists for methods and apparatuses to provide a system that will adapt to the presence of the added transceiver.

SUMMARY OF THE INVENTION

The following summary description briefly describes exemplary embodiments, but does not limit the invention or the appended claims to these example embodiments.

In accordance with an embodiment of the present invention, a method for use of a shared frequency spectrum comprises receiving radio signals from a shared frequency spectrum; detecting time varying signal energy in the shared frequency spectrum; correlating the detected signal energy to predetermined patterns of time division duplex (TDD) signals; and determining from the correlation whether radio transmitters are present. In yet another embodiment, the above described method further comprises recovering timing information identifying the TDD signal patterns in use from the correlation; and selecting a TDD signal pattern for communications that reduces interference with other apparatuses using the shared frequency spectrum.

In accordance with another embodiment, the above described methods further comprise transmitting TDD signals on the shared frequency spectrum using the selected TDD signal pattern. In another embodiment, the above described method further comprises selecting a transmit power level. In yet another embodiment, the above described method further comprises performing the above steps and selecting an uplink (UL)/downlink (DL) pattern of TDD signals that does not overlap the TDD UL/DL patterns in use by other radio transmitters.

In accordance with an embodiment of the present invention, an apparatus comprises a radio transceiver configured to transmit and receive radio signals on a shared frequency spectrum; circuitry configured to receive time division duplex (TDD) radio signals from the shared frequency spectrum; circuitry configured to detect the time varying signal energy in said shared frequency spectrum; circuitry configured to correlate the detected time varying signal energy with predetermined TDD patterns; and circuitry configured to determine from the correlation result whether the shared frequency spectrum is in use by one or more other radio transmitters.

In another embodiment, the above described apparatus further comprises circuitry configured to select a TDD pattern for communication using radio signals on the shared frequency spectrum to reduce interference with other apparatuses.

In another embodiment, the above described apparatus further comprises a portion of user equipment in a wireless communication system. In another embodiment, the above described apparatus further comprises a portion of a base station in a wireless communication system. In another embodiment, the above described apparatus further comprises an integrated circuit.

In yet another embodiment, the above described apparatus further comprises storage circuitry configured to store the predetermined patterns for TDD signaling on the shared frequency spectrum. In another embodiment, the above described apparatus further comprises circuitry configured to select a power level for transmission on the shared frequency spectrum.

In another embodiment, the above described apparatus further comprises circuitry configured to select a pattern of uplink (UL) and downlink (DL) TDD signals. In another embodiment, the above described apparatus further comprises circuitry configured to select the pattern in a manner that avoids overlap with the TDD patterns in use by other radio transmitters.

In accordance with another embodiment of the present invention, a method comprises determining a predetermined set of permitted patterns of time division duplex (TDD) signals from a finite set of patterns and storing the predetermined patterns within radio transceivers operable to transmit TDD signals over a shared radio resource.

In accordance with another embodiment, the above described method is provided and further at least one of the predetermined set of permitted patterns includes uplink (UL), downlink (DL) and unused timeslots. In another embodiment, the above described method is provided wherein at least one of the predetermined set of permitted patterns provides UL and DL timeslots that do not overlap the UL and DL timeslots of at least one other of the predetermined set of permitted patterns.

In accordance with yet another embodiment of the present invention, a method comprises receiving radio signals including time division duplex (TDD) signals from a shared radio resource; detecting the time varying signal energy in the received radio signals; determining from the detecting that one of several predetermined patterns has a correlation; determining from the correlation result whether a radio transmitter is using the shared radio resource; if a radio transmitter is using the shared radio resource, detecting the TDD pattern in use by the radio transmitter from the predetermined patterns; selecting for communication a different TDD pattern from the predetermined patterns; and communicating to a second apparatus the selected TDD pattern for future use in communications using the shared radio resource.

In yet another embodiment, the above described method wherein receiving radio signals comprises providing mobile user equipment having a radio transceiver and receiving signals in the radio transceiver. In another embodiment, the above described method wherein communicating to a second apparatus comprises transmitting a radio signal to a wireless base station. In yet another embodiment, the above described method wherein the shared radio resource comprises a shared frequency spectrum. In yet another embodiment, the above described method wherein selecting for transmission a different TDD pattern comprises selecting a transmit power level for radio transmissions. In another embodiment, the above described method wherein selecting for transmission a different TDD pattern comprises selecting a pattern of uplink (UL) and downlink (DL) timeslots.

In accordance with another exemplary embodiment, an integrated circuit is provided, comprising a radio transceiver configured to transmit and receive radio frequency signals using a shared frequency spectrum; a flexible spectrum usage controller configured to select a pattern for transmission of time division duplex (TDD) radio signals from one of a predetermined set of permitted patterns; a radio signal transmission detector configured to detect the time varying signal energy in radio signals received by the radio transceiver from the shared frequency spectrum; a correlation function configured to determine the pattern used for TDD signals on the shared frequency spectrum by another radio transceiver; and storage configured to store the predetermined set of permitted patterns.

In yet another embodiment, the above described integrated circuit is provided wherein the flexible spectrum usage controller comprises a programmable circuit executing instructions. In another embodiment, the integrated circuit described above is provided wherein the storage is further configured to store executable instructions for the programmable circuit. In another embodiment, the above described integrated circuit is provided wherein the integrated circuit is a portion of a wireless communication element. In yet another embodiment, the above described wireless communication element is provided wherein the wireless communications element is a portion of a basestation. In still another embodiment of the present invention, the above described wireless communications element is provided wherein the communications element is a portion of mobile user equipment.

In yet another embodiment of the present invention, a computer readable medium is provided, containing instructions that, when executed by a programmable radio transceiver configured to transmit TDD signals, perform the steps of receiving radio signals from a shared frequency spectrum; detecting time varying signal energy in the shared frequency spectrum; correlating the detected signal energy to predetermined patterns of time division duplex (TDD) signals; and determining from the correlation whether radio transmitters are present using the shared frequency spectrum. In still another embodiment, the above described computer readable medium further comprises instructions that, when executed by a programmable radio transceiver configured to transmit TDD signals, perform the steps of recovering timing information identifying the TDD signal patterns in use from the correlation; and selecting a TDD signal pattern for communications that reduces interference with other apparatuses using the shared frequency spectrum.

In yet another embodiment of the present invention, an apparatus comprises means for transmitting and receiving radio signals on a shared frequency spectrum; means for receiving time division duplex (TDD) radio signals from the shared frequency spectrum; means to detect the time varying signal energy in said shared frequency spectrum; means to correlate the detected time varying signal energy with predetermined TDD patterns; means to determine from the correlation result whether another radio transmitter is using the shared frequency spectrum; and means to select a TDD pattern for receiving radio signals on the shared frequency spectrum to reduce interference with other radio transmitters.

In yet another embodiment, the above described apparatus further comprises means for transmitting TDD signals on the shared frequency spectrum using the selected TDD signal pattern. In still another embodiment, the above described apparatus further comprises means for selecting a transmit power level.

In yet another embodiment of the preferred invention, a system comprises a plurality of radio transceivers for communicating time division duplex (TDD) signals over a shared frequency spectrum, each using a TDD timeslot pattern selected from a predetermined set of TDD timeslot patterns. In yet another embodiment, the above described system wherein at least one of the plurality of radio transceivers is configured to selectively modify the TDD timeslot pattern it uses for transmitting TDD signals so as to reduce the overlap with another one of the radio transceivers using the shared frequency spectrum.

In accordance with another embodiment, a first transceiver prepares to receive signals transmitted from a second transceiver over a shared radio resource. The first transceiver evaluates the radio environment by receiving radio signals from a shared frequency spectrum; detecting time varying signal energy in the shared frequency spectrum; correlating the detected signal energy to predetermined patterns of time division duplex (TDD) signals; and determining from the correlation whether other radio transmitters are present using the shared frequency spectrum. In still another embodiment, the above described method further comprises the steps of recovering timing information identifying the TDD signal patterns in use from the correlation; and selecting a TDD signal pattern for reception that reduces interference with other transceivers using the shared frequency spectrum. In another embodiment, the above described method further comprises transmitting the selected TDD signal pattern from the first transceiver to the second transceiver. In another embodiment of the above described method, the second transceiver further modifies the TDD signal pattern used for transmissions to the first transceiver based on the selected TDD signal pattern.

It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DETAILED DESCRIPTION

Example embodiments are discussed in detail below. It should be appreciated, however, that the present invention provides inventive concepts that can be embodied in a wide variety of contexts.

Even though the majority of embodiments describe a wireless system with shared frequency use (FSU), the invention may also be applied to other communications systems where a resource allocation is shared among transmitters.

Figure 1:
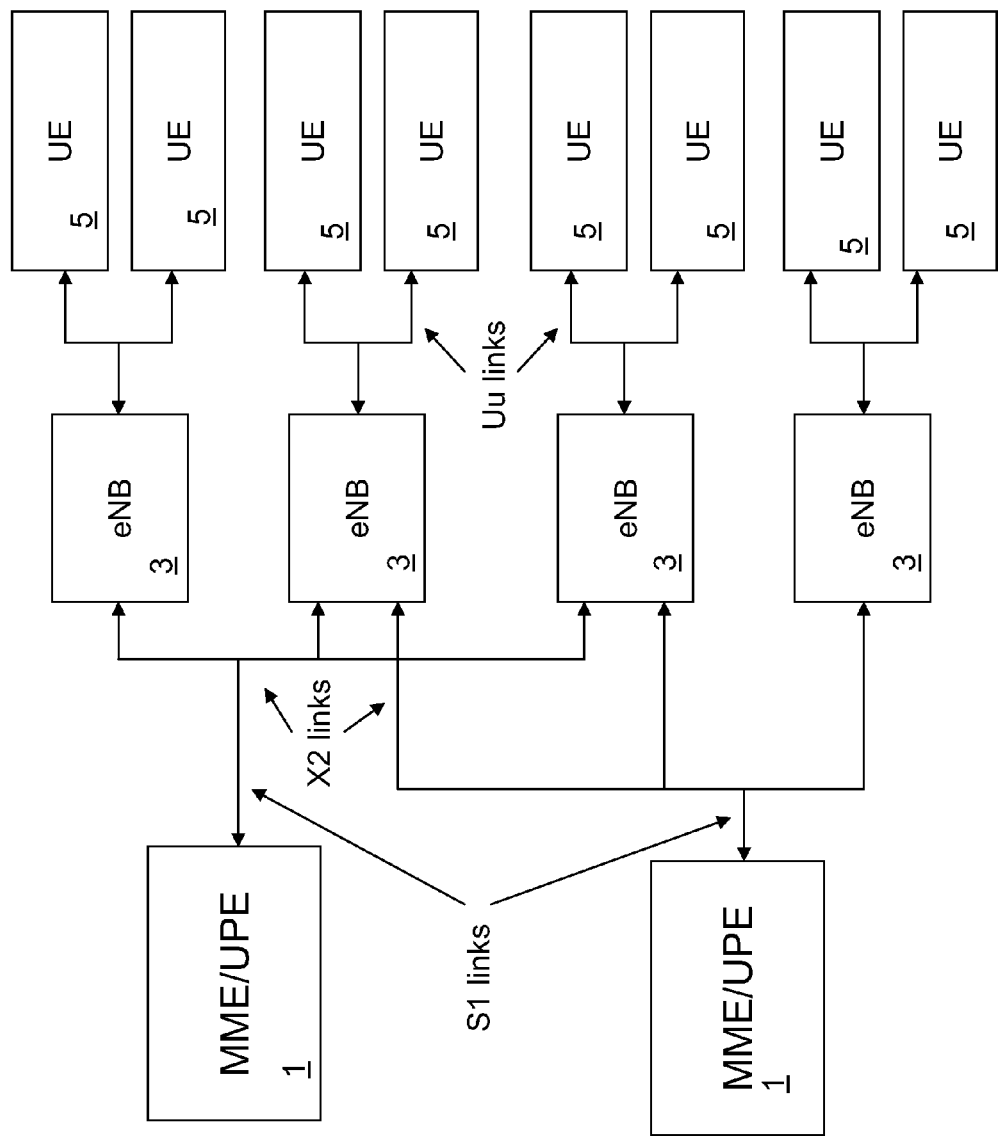
FIG. 1 illustrates in a simple block diagram the levels of service in a UTRAN or E-UTRAN communication system.

Prior to presenting embodiments of the invention, some additional background information will be provided to increase the readers' understanding of the characteristics and problems of some systems. Referring initially to FIG. 1, illustrated is a system level diagram of a radio frequency interface communication system including a wireless communication system that provides an environment for the application of the principles of the present invention. The wireless communication system may be configured to provide features included in the UMTS terrestrial radio access network ("UTRAN") or the evolved UMTS terrestrial radio access network ("e-UTRAN") services. Mobile management entities ("MMEs") and user plane entities ("UPEs") designated by reference 1 provide control functionality for one or more e-UTRAN node B (designated "eNB," an "evolved node B," also commonly referred to as a "base station") 3 via an S1 interface or communication link. The base stations communicate via an X2 interface or communication link. The various communication links are typically fiber, microwave, or other high-frequency metallic communication paths such as coaxial links, or combinations thereof.

The base stations further communicate over an air interface with user equipments 5 (designated "UE"), typically a mobile transceiver carried by a user. Alternatively, the user equipment 5 may be a mobile web browser, text messaging appliance, a laptop with a mobile PC modem, or other user device configured for cellular or mobile services. Thus, communication links (designated "Uu" communication links) coupling the base stations to the user equipment are air links employing a wireless communication signal. For example, the devices may communicate using a known signaling approach such as a 1.8 GHz orthogonal frequency division multiplex ("OFDM") signal. Other radio frequency signals may be used.

Figure 2:
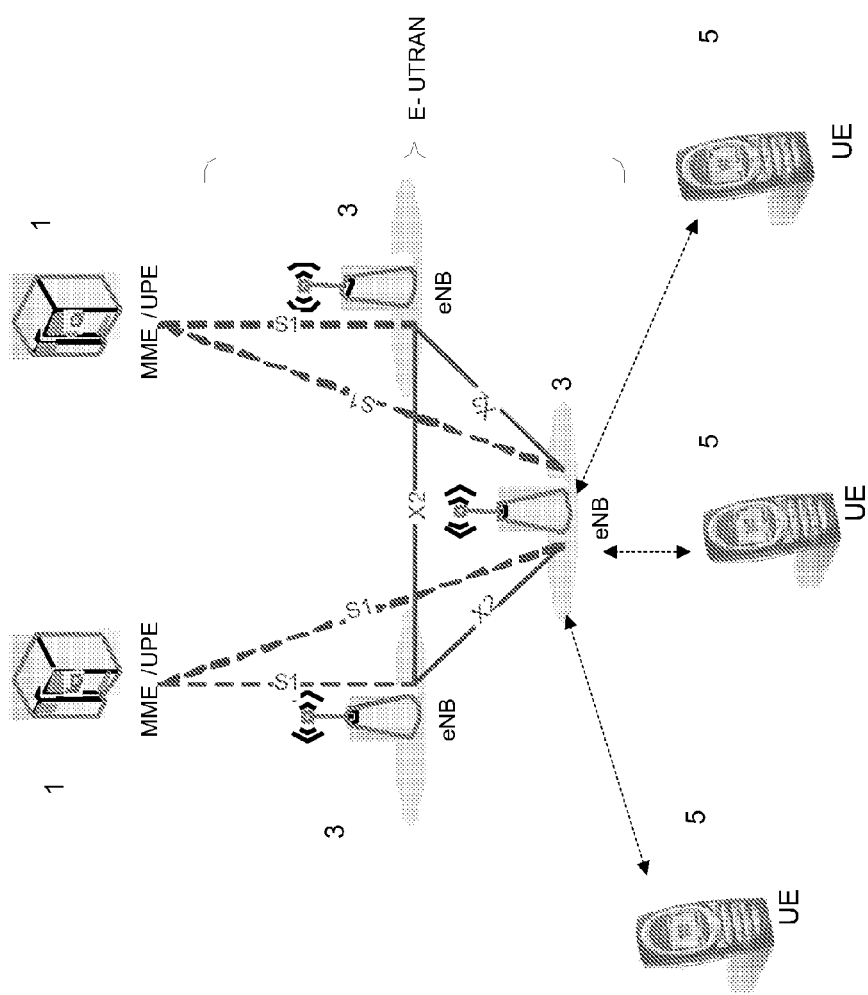
FIG. 2 illustrates a portion of the communications system of FIG. 1 that includes user equipment, base stations, and network connections.

FIG. 2 illustrates in a system level diagram a communication system including a wireless communication system that provides an environment for the application of the principles of the present invention. The wireless communication system provides an e-UTRAN architecture including base stations 3 (designated in the LTE 3GPP nomenclature as e-Node B or "eNBs") providing e-UTRAN user plane (packet data convergence protocol/radio link control/media access control/physical transport) and control plane (radio resource control) protocol terminations directed towards user equipment 5 (designated as "UE"). The base stations 3 are interconnected with an X2 interface or communication link. The base stations 3 are also connected by an S1 interface or communication link to an evolved packet core ("EPC") including, for instance, a mobility management entity 1 ("MME") and a user plane entity ("UPE"), which may form an access gateway ("aGW"), a system architecture evolution gateway. The S1 interface supports a multiple entity relationship between the mobility management entities/user plane entities and the base stations and supports a functional split between the mobility management entities and the user plane entities.

The base stations 3 in FIG. 1 or 2 may host functions such as radio resource management (e.g., internet protocol ("IP"), header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity 1 may host functions such as distribution of paging messages to the base stations, security control, terminating U-plane packets for paging reasons, switching of U-plane for support of the user equipment mobility, idle state mobility control, and system architecture evolution bearer control. The user equipment receives an allocation of a group of information blocks from the base stations.

Some standards comprise frequency division duplex (FDD) spectrum allocated in paired channels with uplink (from a mobile user equipment to a base station) and downlink (from the base to the mobile station) channels. Another approach is based on time division duplex (TDD) channels where uplink and downlink communications are separated into time slots. In a more general manner, radio frequency resources can be divided in both time and frequency, combining aspects of both TDD and FDD. An example for such a "hybrid" system is GSM.

Figure 3:
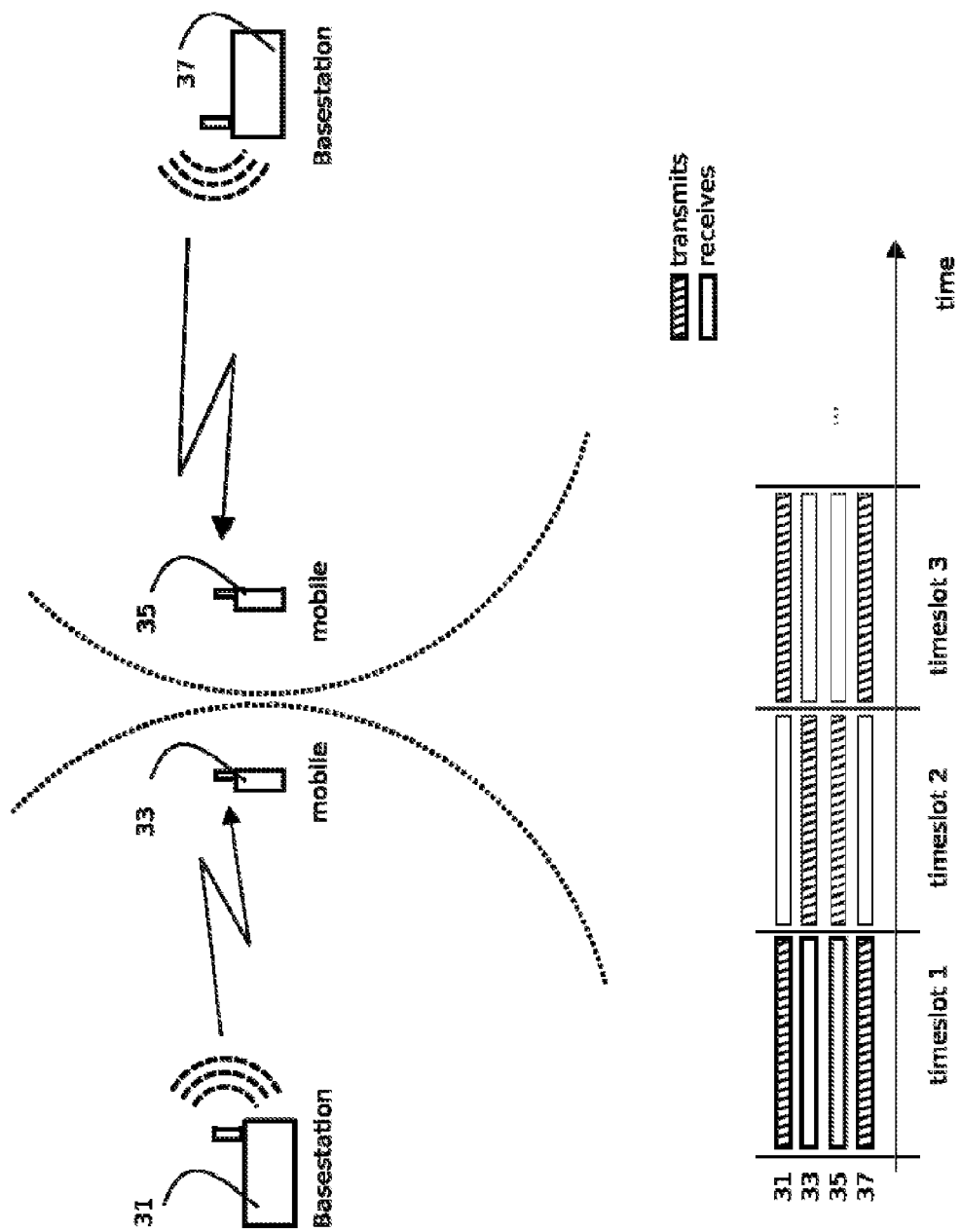
FIG. 3 is a diagram illustrating a pair of base stations communicating over an air interface to a pair of mobile devices in a synchronized TDD system.

In many TDD wireless communications systems, synchronization is used in the same frequency band. In a synchronized TDD network, it is possible to reuse the same radio resource (frequency spectrum) with manageable interference. FIG. 3 illustrates one typical scenario.

In FIG. 3, a basestation 31 is communicating with mobile 33. Basestation 37 is communicating with mobile 35 using the same radio resources, e.g. at the same frequency. The timeline depicts time slots in a TDD protocol used for these communications. As shown in FIG. 3, timeslot 1 is a downlink slot, and timeslot 2 is an uplink timeslot. In timeslot 1, the base stations 31 and 37 are both transmitting. Because of the spatial separation between the two areas where the signals are strong enough to be received, there is no interference and both basestations may transmit at the same frequency in timeslot 1.

Figure 4:
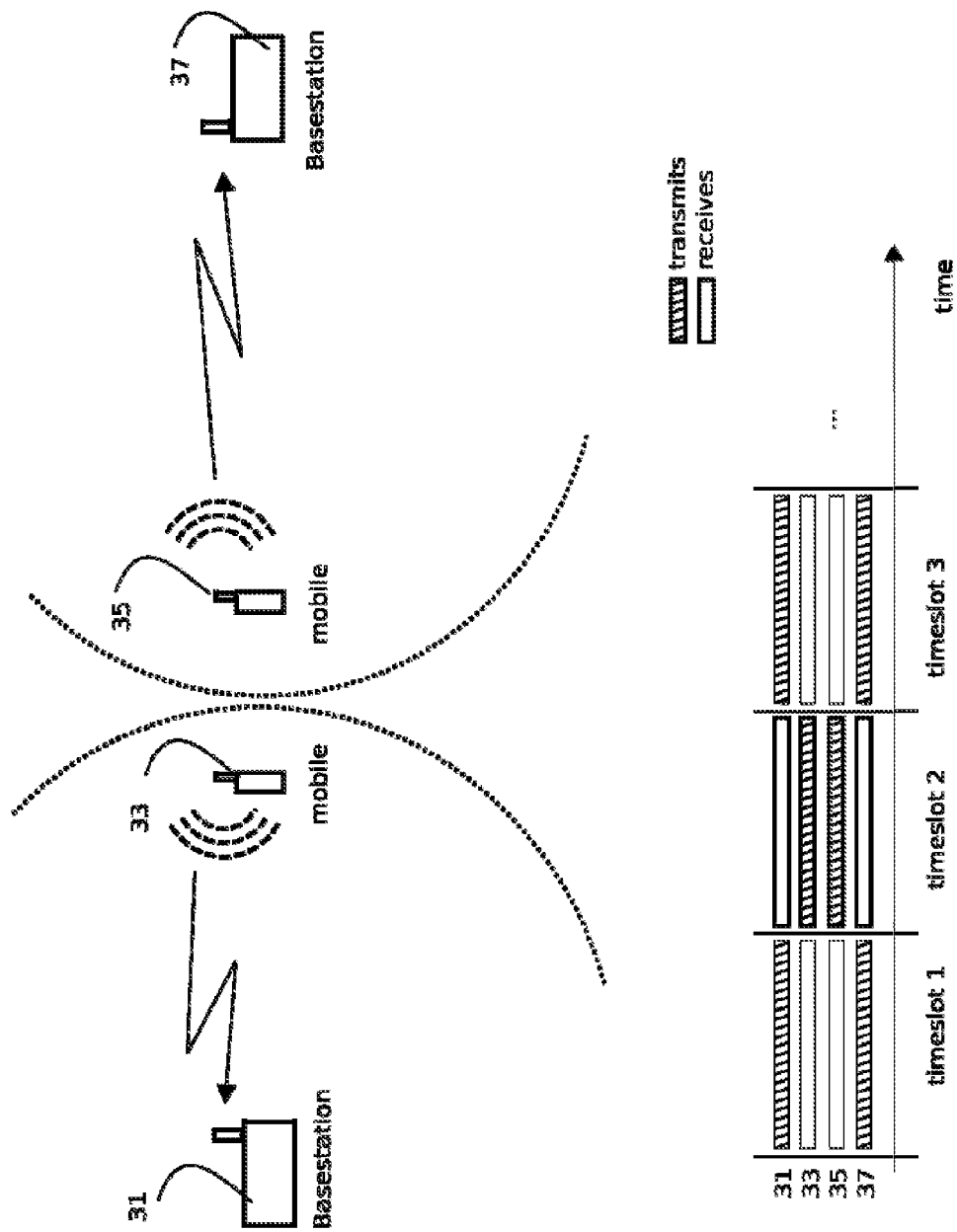
FIG. 4 is a diagram illustrating the base stations and mobile devices of FIG. 3 communicating over the air interface in the synchronized TDD system.

In FIG. 4, a similar situation is shown as in FIG. 3 for the same system at timeslot 2, which is an uplink timeslot. Mobile 33 is transmitting to basestation 31 in the uplink direction. At the same time, mobile 35 is transmitting to basestation 37 in the uplink direction. These transmissions can use the same frequency as the spatial separation (illustrated by the dotted curves) between the transmitters, ensuring that no interference will occur.

Figure 5:
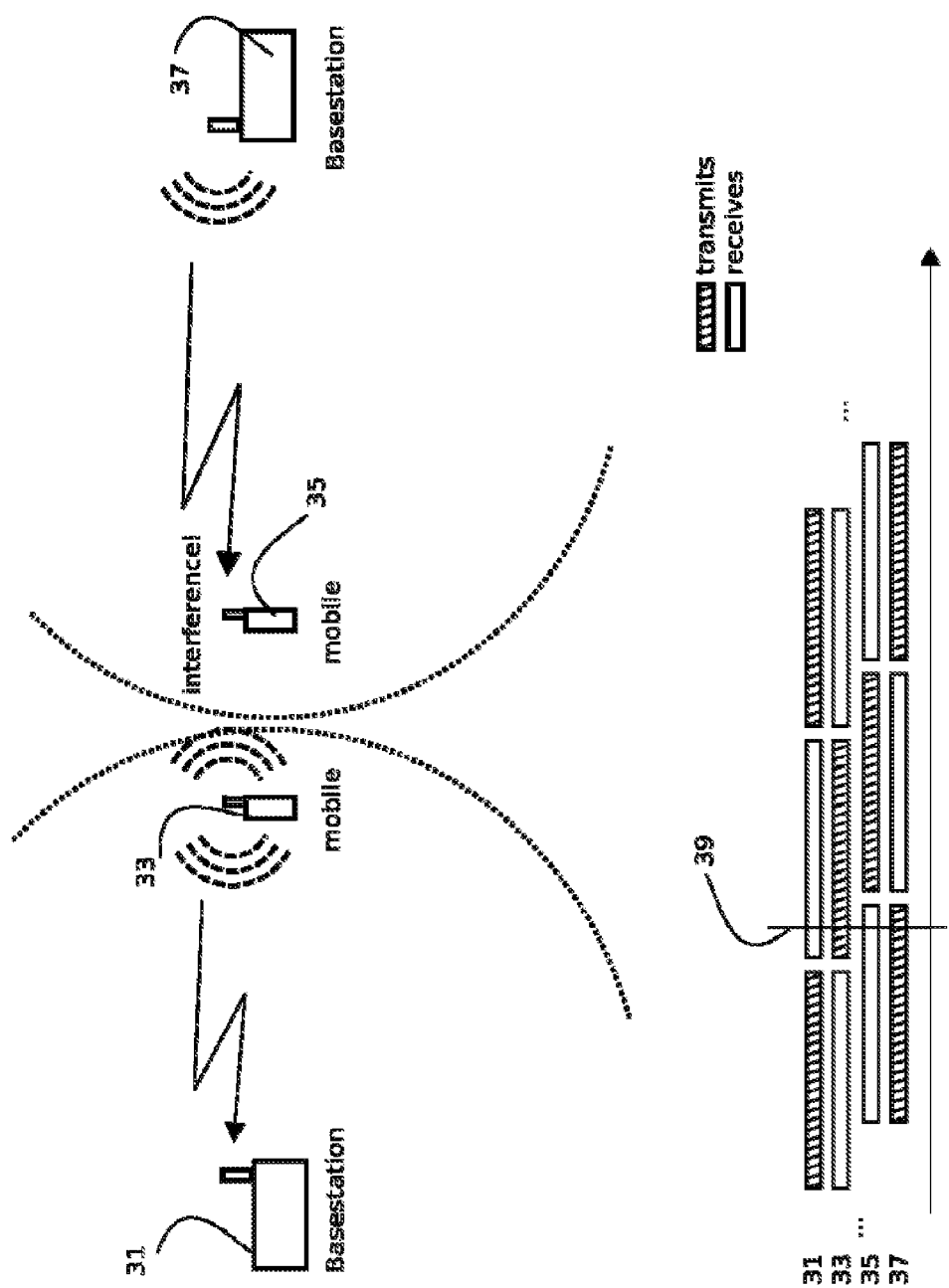
FIG. 5 is a diagram illustrating interference problems that could occur when mobiles and base stations communicate over an air interface in an unsynchronized TDD system.

In FIG. 5, communications in an unsynchronized TDD system are shown. In FIG. 5, the timeline shows basestation 31 initially transmitting to mobile 33. Somewhat later, at a point in time not synchronized to the first transmission, base station 37 begins transmitting to mobile 35. Then at time 39, mobile 33 begins transmitting to basestation 31. Now, although the basestations 31 and 37 are far apart, the mobiles 33 and 35 are near to each other as shown. Because the TDD transmission direction is not synchronized, the uplink message from 33 to 31 is interfering with the downlink message from 37 to 35 occurring at the same time and using the same radio resource, e.g. the same frequency spectrum.

FIG. 5 illustrates a problem that may occur when TDD transceivers sharing frequency spectrum are not synchronized in a TDD system. Conventional solutions to this problem are to make the basestations communicate and share a common time reference, using GPS for example. This may be done over a wired or wireless interface; alternatively, an approach might be to have the basestations communicate additional information with each other over the air interface. This latter approach may not be feasible if the basestations are located spaced apart as shown in FIG. 5. Although it is feasible that the mobile stations could act as relays, problems with equipment that does not interoperate (from different vendors or using different codes, for example) may prevent that approach from working effectively.

Further, the need for flexible spectrum usage systems that allow additional transceivers to be added in a shared spectrum, without the need for a fixed time reference or other system hardware, is clear. Due to the high data rates involved, the network backbone may be a challenge in adding services, both in terms of cost and complexity. Present cellular systems are built on a rigid, expensive wired infrastructure that uses fixed network planning Future systems may be deployed, at least in part, in a distributed, ad hoc manner similar to those used in providing WLAN access points. These "islands" would operate by providing a network access and electrical connection to additional basestations. Instead of the fixed network and advanced planning used today, it is predicted that these networks will allocate resources such as frequency spectrum at runtime, eventually evolving into a form of a self-organizing network.

In particularly dense environments, it is envisioned that what is needed is a dense mesh of small basestations, with an overlapping layer of larger wireless cells; these cells could be the existing "standard" LTE system, providing coverage over a wide area. These small or "femto" basestations may require only network connection and electricity to form an additional coverage "hot spot".

Embodiments of the present invention comprise methods and apparatuses that provide solutions to the problem of flexible spectrum usage. Interoperability across hardware vendors and system operators is assured by providing a known set of rules for using the radio resource.

In an embodiment, a transceiver, prior to beginning transmitting, will first monitor the transmissions in the environment on the shared radio resource, for example shared frequency spectrum. Known patterns of TDD communications will be used by all of the transceivers (by prior arrangement). The transceiver of interest will detect, from the signal envelope, the patterns in the environment, and perform a correlation with known patterns. The result of the correlation will indicate which patterns the other transceivers in the environment are using. The transceiver can then tailor its own patterns of frequency spectrum use to avoid or minimize the likelihood of interference with the communications of the other transceivers. The modified parameters may comprise the transmit power, the codewords used, the TDD timeslot patterns and the UL/DL patterns used.

Figure 6:
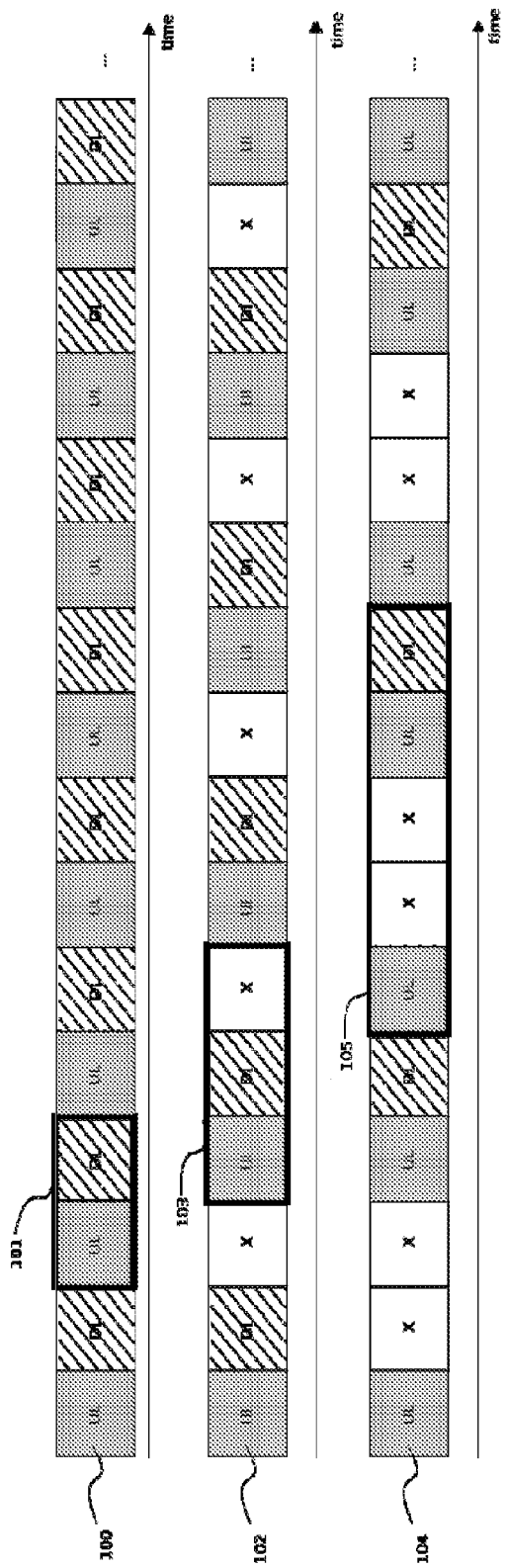
FIG. 6 is a diagram illustrating timeslot patterns for TDD systems using three different patterns.

FIG. 6 depicts timelines showing TDD patterns that might be observed in an environment. In FIG. 6, timeline 100 indicates a symmetric uplink (UL)/downlink (DL) pattern is in use. It is important to note however that some transceivers may be sending broadcast traffic or other traffic that would be many packets in a single direction; for example, downlink (DL). The methods and apparatuses of the present invention are not limited to environments that have both uplink and downlink traffic; the environment is monitored for the TDD pattern and not the direction. The method and apparatus embodiments of the invention are applicable to any environment with shared spectrum radio resources.

In FIG. 6, timeline 100 illustrates a short portion of TDD communications with time increasing from left to right. In a practical system method embodiment, the portion monitored would be much greater than this example, which is simplified for ease of illustration only. A key aspect of the embodiments of the invention is that the power envelope has correlation properties that make the patterns easy to detect. This aspect is not visibly clear in patterns this short but is important to recognize as an advantage of the embodiments.

In the trace labeled 100, the radio resource is shown in a pattern where the communications are evenly divided, in time slots, between uplink and downlink transmissions. Box 101 illustrates that the pattern repeats every two slots with no unused slots.

A different pattern is shown in the trace labeled 102, with the pattern repeating every three time slots as indicated by the samples in box 103. Here, one slot of every three slot patterns is left unused, leaving a portion of the shared radio resource available for other users. In a crowded radio environment, the methods of the present invention assume that the radio transceivers will all include FSU mechanisms that cause the radios to revert to resource use patterns with a lower density of active timeslots, allowing the resource to accommodate a higher number of users. Each particular radio will have a correspondingly lower data rate, of course, but the overall capacity of the resource will increase.

Trace 104 illustrates a third pattern, with a cycle length of five timeslots. This is illustrated by the sample in box 105. The pattern has an asymmetric division between uplink and downlink communications.

Figure 7:
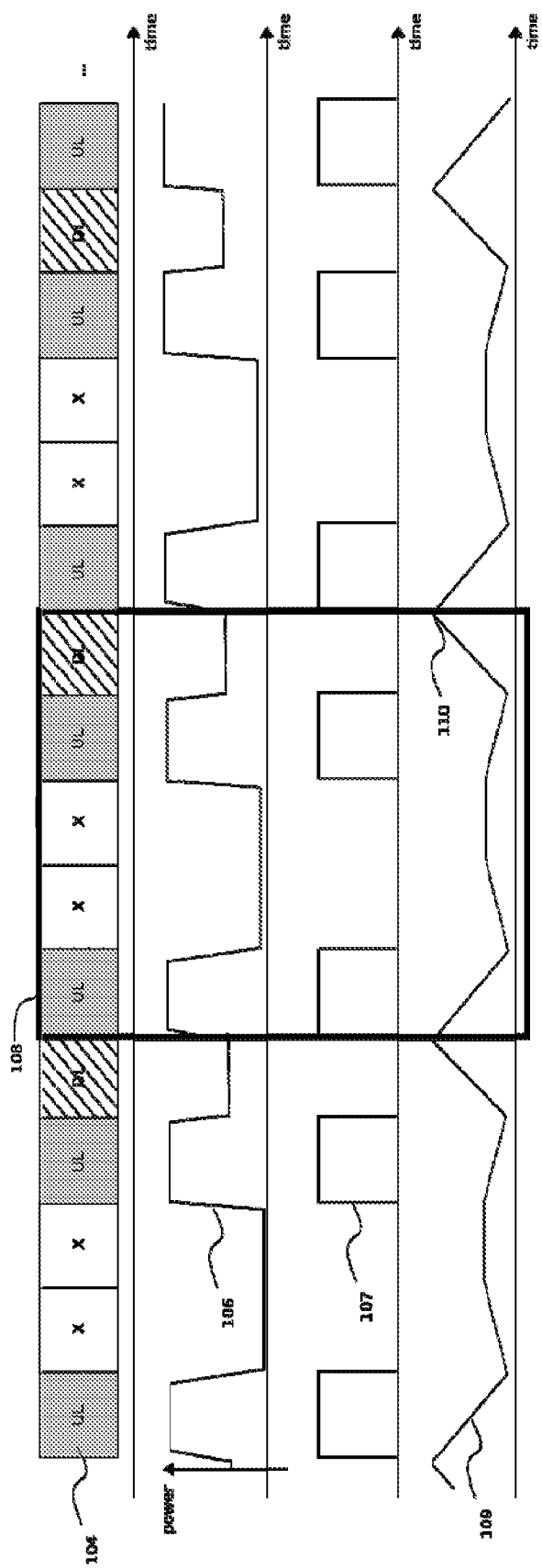
FIG. 7 is a diagram illustrating a timeslot pattern of FIG. 6.

FIG. 7 illustrates graphically the results obtained performing an embodiment of the present invention. Consider a case where a pair of transceivers A and B are communicating in the pattern of trace 104. In this very simple case, transceiver A is transmitting the UL slots (transceiver A may be mobile equipment, for example) and transceiver B is utilizing the DL slots in the time diagram (transceiver B may be a base station, for example). Now a transceiver C utilizing an embodiment of the present invention is turned on. The transceiver C, prior to transmitting any TDD communications on the shared radio resource, begins by performing a power measurement of the shared radio resource, as illustrated by trace 106 in FIG. 7. Power measurements as shown in FIG. 6 illustrate that the path loss between transceiver A and transceiver C is the smallest, so the power measurement is dominated by the timeslots for UL, which are shown as solid shaded slots labeled UL.

In this embodiment, the receiver in transceiver C has knowledge of all allowed timeslot patterns, and the allowed UL/DL sub patterns. This information may be stored in a memory in the form of a look up table or programmed in software executing in a processor in the transceiver, for example. Using these known allowed patterns, the receiver C performs a correlation algorithm. In this example, a result of the correlation algorithm, using the power measurement in trace 106 and a known pattern according to trace 107, is shown in trace 109. The output from the correlation algorithm may show a correlation peak 110, whose location in time may indicate the slot level timing of transmit activity of transmitter A, according to pattern 104. Subsequently, transceiver C compares the magnitude of correlation peak 110 against a threshold, deciding on the presence or absence of another radio transmitter using pattern 107. Said threshold is chosen to result in a desirable compromise between detection probability and false alarm probability.

The transceiver C can now perform a method where it has identified the presence of another radio, it has acquired the slot level timing in use by the other radio, and it can now perform a method where it predicts the future interference that could occur and thus it can schedule its own use of the shared radio resource to minimize or prevent that interference.

Thus, the steps of the embodiment can be stated as: using a predetermined TDD pattern or code with predetermined UL/DL patterns with desirable autocorrelation properties; using envelope detection on a symbol time scale to recover any timeslot pattern including UL/DL patterns; searching for one or several known timeslot patterns from one of several known patterns; deciding on the presence of other radios in the environment using the shared radio resource, and scheduling use of the shared radio resource to minimize interference between the transceivers. Note that the steps may be performed in many orders, the order listed is not limiting. For example the envelope detection may be performed prior to any reference to a known pattern; alternatively, it could be performed later.

The embodiments of the present invention do not require any foreknowledge of the other transceivers in the environment. Importantly, the FSU embodiments of the present invention do not require base stations, or transceivers of any kind, to communicate to coordinate their use of the shared spectrum, either through the hardwired network backbone or by the use of additional over the air communications. This importantly provides flexible use of the shared radio resource between transceivers where the transceivers are located far apart and thus cannot communicate directly. Further, the embodiments of the present invention may be performed by transceivers that use different coding schemes or are otherwise provided by different operators where direct communication between them may be difficult in any event. The embodiments of the present invention also do not require any common time reference to perform TDD communications over the shared radio resource.

Figure 8:
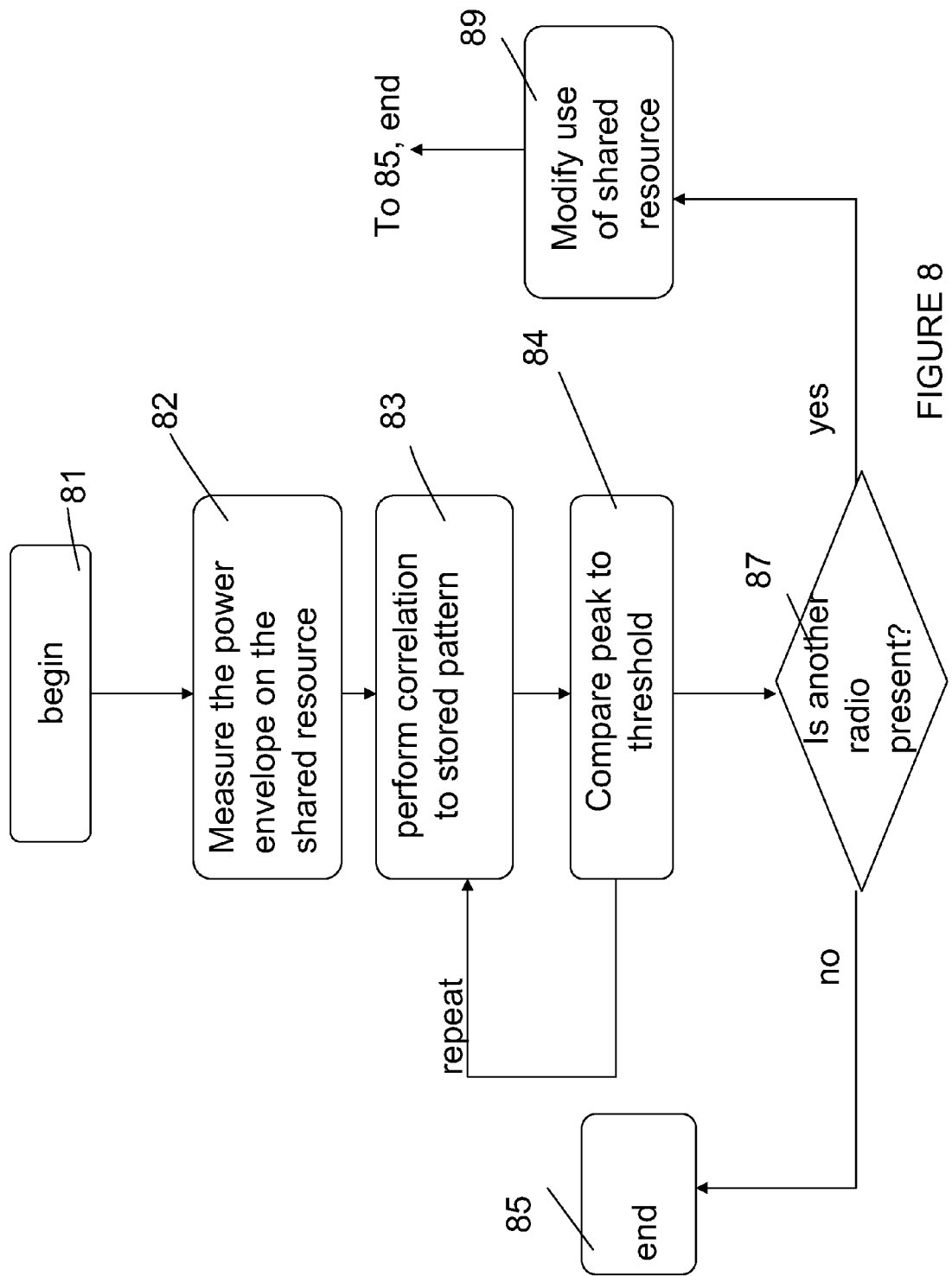
FIG. 8 is a flow chart illustrating the steps of a method embodiment.

FIG. 8 illustrates, in a flowchart format, the steps performed by one embodiment of the present invention. In FIG. 8, the flow diagram begins with state 81. A radio transceiver, for example a base station or Node B or e-Node B, begins in a new environment. In state 82, the radio transceiver first measures the power envelope of the shared radio resource (typically a frequency spectrum identified as shared). In state 83, the power envelope detected is evaluated in the radio transceiver using a correlation algorithm with every allowed pattern. By agreement, the transceivers using the shared radio resource will use only patterns and sub patterns from the predetermined set. These patterns and sub patterns may be stored in the transceiver in the form of look up tables, such as a ROM or flash memory, or may be coded as executable code that a processor runs within the transceiver, or as another alternative, fetched from some other stored location. As further described below, states 83 and 84 may be performed, for example, in a loop fashion comparing each known stored pattern. For each pattern, a correlation peak is determined as shown; for example, in FIG. 7, and the peak is compared in state 84 to a predetermined threshold. The threshold for comparison is selected to balance the probability of detection against the possibility of false alarms, and may be changed to ensure reliable operation. During the loop checking the patterns against the detected envelope, a flag will be set if a pattern is detected.

In state 87, the radio transceiver has processed enough information to determine whether another radio using the shared resource is present in the environment. For example, during the loop of states 83 and 84, a flag may be set if a pattern is detected that exceeds the correlation threshold, indicating a radio transmitter is using the shared resource.

The flag is tested in state 87. Note that this determination of whether another transmitter is using the shared radio resource was accomplished autonomously, that is, there was no need for communication either over the air, or over a wired network, between radio transceivers to make this determination. If no radio was detected, the embodiment transitions to the end state, state 85. If another radio is using the shared resource in the vicinity of the new radio transceiver, the radio transceiver transitions to state 89 where the transceiver may, if needed, modify its own patterns for UL/DL slots to ensure that any interference is avoided, or at least minimized. After state 89, the embodiment transitions to the end state, state 85. In this manner the flexible spectrum usage is accomplished among multiple radios each performing the method embodiment of FIG. 8 autonomously. As shown in FIG. 8, this process is performed only one time; however, in a real system, the radio transceiver, often a base station, may periodically reevaluate the environment to determine if a change in the number of radios, or the pattern of shared resource usage, has changed and if so, it may determine whether it is appropriate to change its own behavior to efficiently share the resource. Further, the transceiver may establish a connection with the other radio to enter radio resource negotiations. Thus, the embodiments include alternative actions that the transceiver may take after identifying other transmitters using a shared radio resource, comprising any or all of modifying its own behavior to reduce or manage interference, negotiating with other transmitters for access to the shared resource that reduces or manages interference, changing its own behavior, and negotiating with other transmitters. In addition, a transceiver preparing to receive signals from another transmitter may signal to the other transmitter a selected pattern that will reduce interference with still other transmitters positioned closer to the receiving transceiver.

In an example embodiment, the correlation to identify the pattern used in a radio environment from a predetermined number of permitted patterns may be described in terms of a software FOR loop. This approach is but one alternative embodiment. In other alternative embodiments, hardware, firmware or different software that accomplishes the correlation and the identification of the patterns in use that vary these steps are also embodiments contemplated as part of the invention and within the scope of the appended claims. This illustrative example does not limit the correlation to the particular steps described above.

An example code segment for doing the correlation used in the embodiments could be formulated as:

Begin;
Set "patterndetect [1:n]" to 'false'; clear a variable array holding flags for each pattern;
Set "radio_detect" to "false"; clear a radio detection flag to be set later;
Receive radio signals;
Detect the power envelope; corresponds to state 82 in FIG. 8;
For p=1 to n, do; for each of n patterns in the predetermined set
  Retrieve pattern[p]; fetch the stored pattern number p;
  Convolve power envelope with pattern[p];
  Search for peak in convolution result;
  Compare peak, threshold; the peak obtained is compared to a threshold;
  If peak is greater than threshold, set patterndetect[p]="true";
  If peak is greater than threshold, set radio_detect="true";
End for;
If radio_detect=true, modify transmit pattern used to be different from pattern detected;
End.

Figure 9:
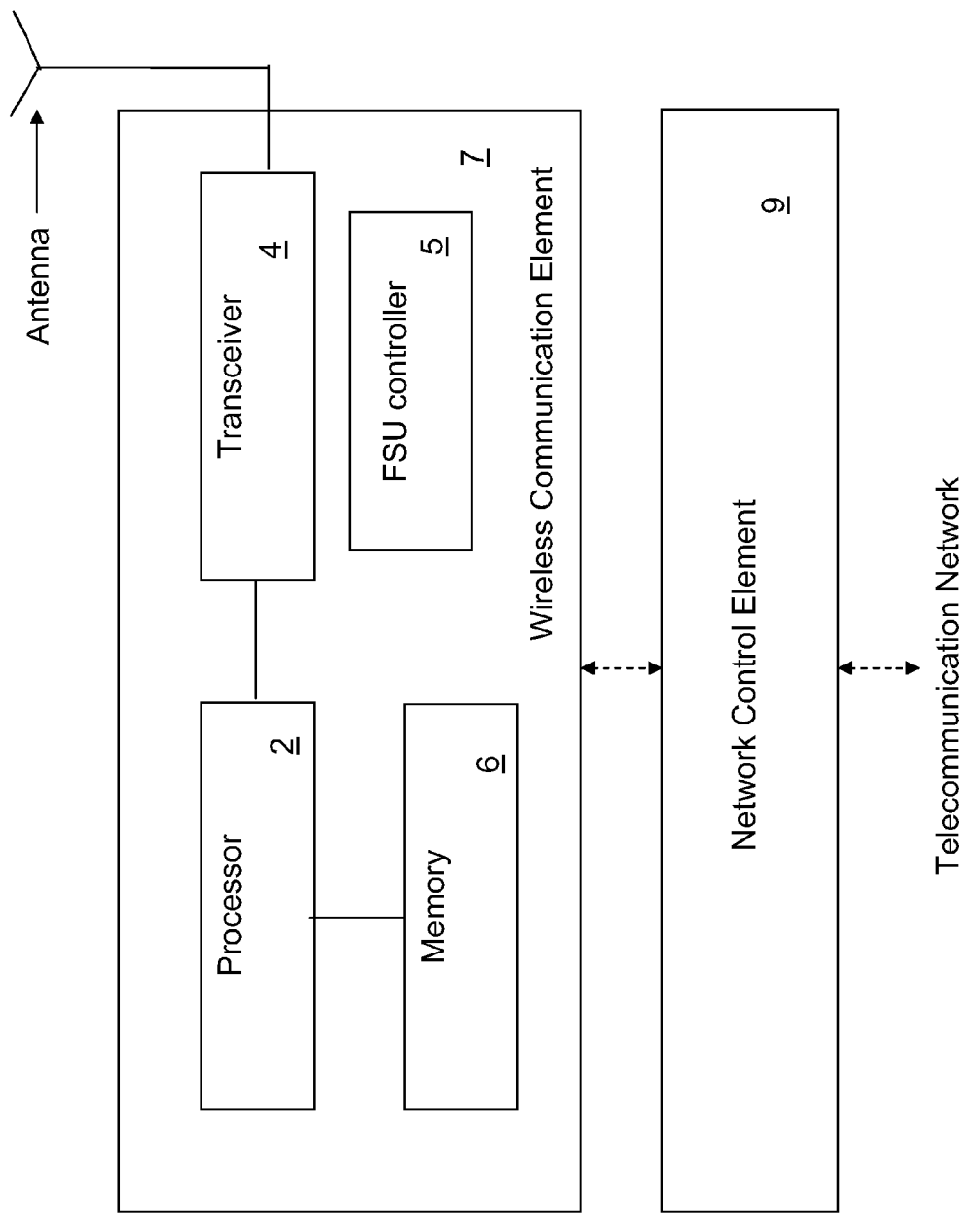
FIG. 9 is a simplified block diagram illustrating an implementation of an embodiment radio frontend of a communications element incorporating the invention.

The embodiments of the invention may be implemented in a variety of circuits or in software executed by programmable devices. FIG. 9 depicts in a simple block diagram form one possible implementation. In FIG. 9, a wireless communication element 7 is shown. This could be implemented as a single IC, or as a circuit board with multiple integrated circuits, or some other partition could be used. For example, the processor 2, the transceiver or radio portion 4 and the FSU controller 5 could be integrated using an application specific integrated circuit (ASIC) and a commodity flash memory could be used for memory 6. Alternatively, an ASIC could form transceiver 4, memory 6 and FSU controller 5 and an off the shelf, programmable processor such as digital signal processor, RISC processor, ARM processor, X86 processor or the like could be used for processor 2. Memory 6 may contain executable instructions that cause the processor 2 to perform the functionality of FSU controller 5, which performs, for example, the steps described above. Alternatively, FSU controller 5 could be a dedicated state machine, while memory 6 may contain the stored patterns for the correlation comparison steps. These and other known variations of the implementation are alternative embodiments of the circuit of FIG. 9 and are contemplated as part of the present invention and fall within the scope of the appended claims.

In FIG. 9, the wireless communication element is shown coupled to a network via a network control element 9; which suggests that in this exemplary embodiment, the wireless communication element is acting as a base station. However, the scope of the claims and the invention are not limited to this illustrative example and the wireless communication element may be other elements. For example, it might be user equipment such as a mobile phone. In that example, the connection to the network will not be present.

Figure 10:
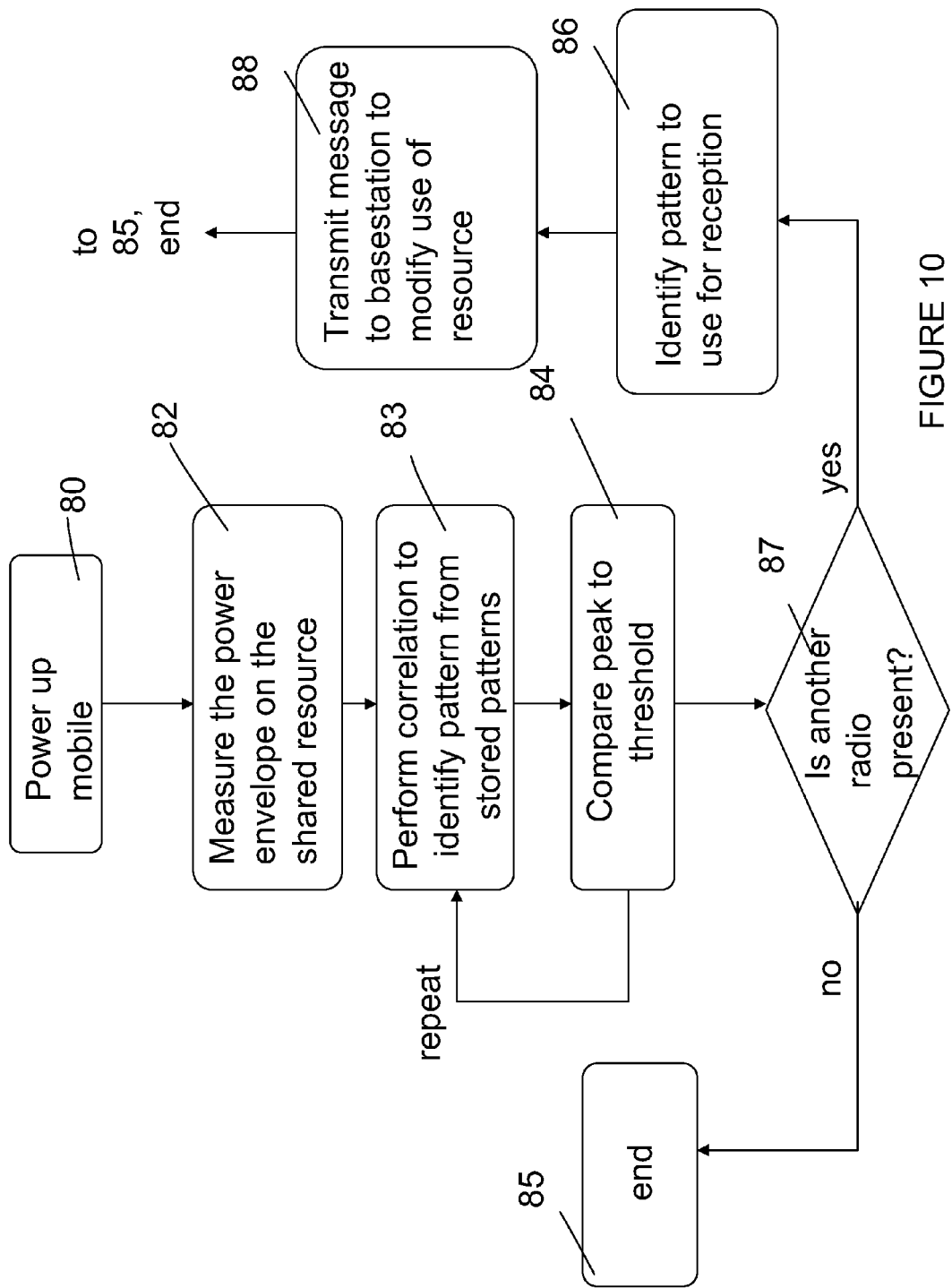
FIG. 10 is a flow chart illustrating the steps of a method embodiment.

FIG. 10 depicts another embodiment in a simplified flow chart. Several of the states or steps of FIG. 10 correspond to steps in FIG. 8 and so identical reference numerals are used for those states.

In FIG. 10, an additional embodiment begins in state 80 when a mobile transceiver such as a cellphone is in the environment, such as when it is first powered up. Before transmitting, the mobile transceiver transitions to a state 82 where the transceiver evaluates the environment by detecting the signaling on the shared resource. In state 82, the power envelope of the shared radio resource is evaluated as before.

In states 83 and 84, the mobile transceiver performs the correlation and peak comparison as before to identify the patterns in use. For each stored pattern in state 83, the transceiver determines the peak correlation of one of the predetermined stored patterns to the detected signal envelope. In state 84, the mobile transceiver performs the comparison of the peak detected pattern to a threshold. In state 87, the mobile transceiver determines whether another radio is present and using the shared radio resource. If not, then the process ends at state 85.

If the decision made in state 87 is yes, indicating another radio is present, the mobile transceiver in this exemplary embodiment may transition to a state 86. In state 86, the mobile transceiver may identify a pattern from the predetermined pattern that, if used for reception of signals on the shared resource, would reduce or avoid interference with the other transmitters using the shared resource. The embodiment then transitions to state 88. In state 88, the mobile transceiver communicates to its corresponding base station indicating what patterns should be used in TDD timeslot allocations for reception by the mobile transceiver. Referring back to FIG. 5, the method of FIG. 10 addresses the unsynchronized communication and near-far interference problems. Here, the embodiment advantageously provides an efficient arrangement for autonomously sharing a radio resource which may avoid or reduce interference with other radios by having a transceiver, such as mobile user equipment, inform the corresponding base station about strong signals nearer to the mobile on the shared resource, and having the base station modify its pattern for TDD timeslot allocation to minimize the interference.

The modifications to use of the shared radio resource that may be made after another radio is detected may comprise any or all of: changing the relative timing of the TDD timeslot pattern, changing the UL/DL sub patterns, and changing the transmit power used. The modifications may be made by the transceivers to reduce, avoid or minimize interference.

For example, in one embodiment, a radio transceiver may use the approaches discussed above to detect the presence of another radio in an adjacent network, estimate the path loss to the adjacent network using the magnitude of the value produced by the detector based on a known transmit power, and adjust the maximum power level of its own transmitter in combination with other parameter adjustments such as the code words used, the modulation type, transmit frequency and the pattern to minimize interference with the adjacent network. In addition, said radio transceiver may establish a communications link to the other radio to negotiate use of radio resources such as bandwidth, time slots and transmit power; for example, in order to achieve efficient use of radio resources and fair sharing. In a particular embodiment, if the transceiver detects a pattern in use on the shared resource where there are no free slots, the transceiver may need to negotiate with the transmitters using the shared resource to modify their patterns so that some free slots become available for the new radio transceiver of interest to utilize.

Figure 11:
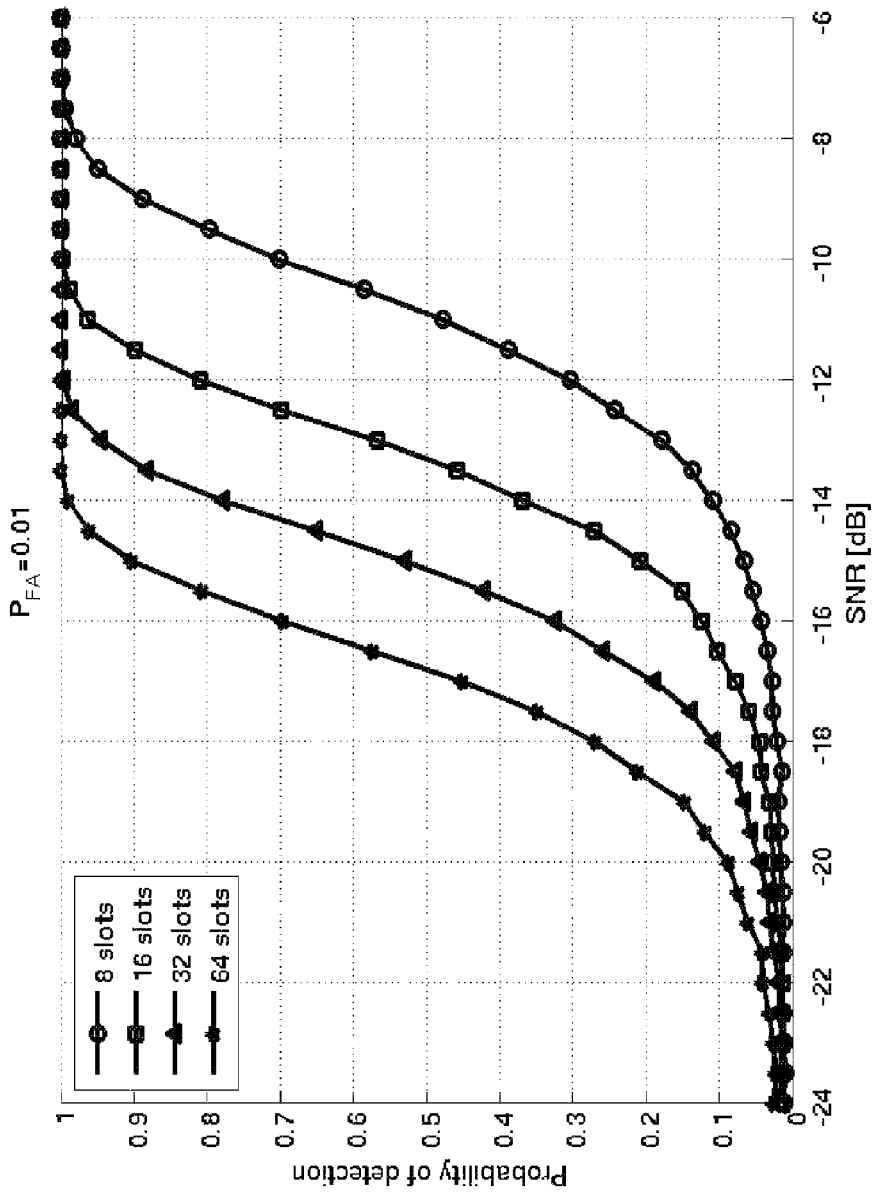
FIG. 11 is a diagram illustrating simulation results obtained using a method embodiment of the invention.

FIG. 11 depicts some example simulation results where the method for detecting the signal envelope is evaluated for different cases. In FIG. 11, the vertical axis plots a probability of detection metric for signals having increasing signal to noise (SNR) characteristics for different UL/DL patterns. For example, using the "16 slot" curve, the probability of detection was shown to reach 95%, at −11 dB. This compares quite favorably with a required SNR of about +10 dB for accurate data reception, the detection occurs at a level about 20 dB below the level for proper data reception.

Figure 12:
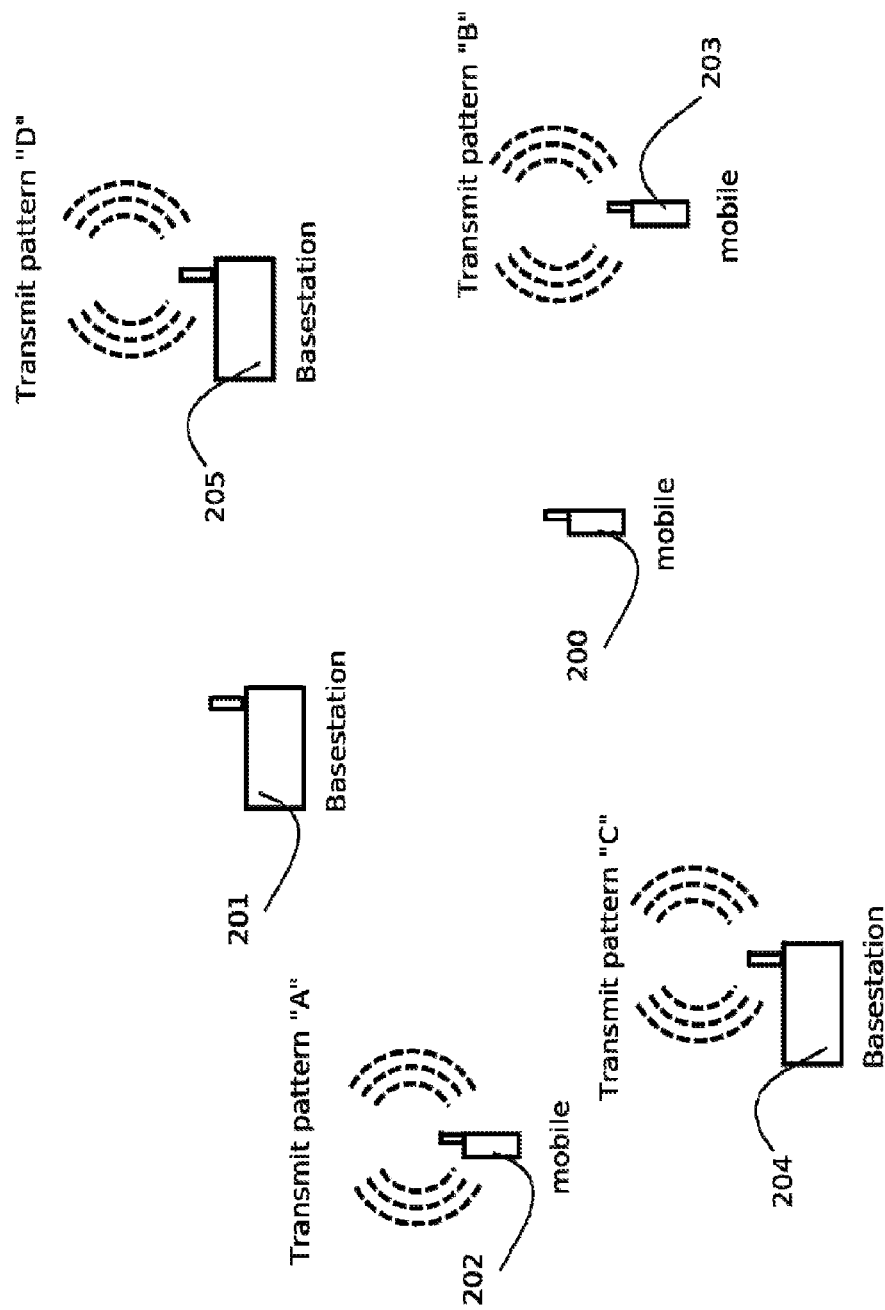
FIG. 12 is an illustration of a plurality of wireless communications elements in an environment illustrating another embodiment of the invention.

FIG. 12 shows another embodiment of the invention. In an example system illustrated in FIG. 12, a plurality of wireless communications elements are shown in an environment. Mobile device 200 intends to receive data from basestation 201. The common radio resource is shared with other mobile devices 202 and 203 and other basestations 204 and 205. The radio system defines a set of allowed non-overlapping transmit patterns, designated as patterns "A" to "F". These are the predetermined allowed patterns known to the transceivers for use on the shared resource. According to the approach already disclosed, mobile device 200 performs a power measurement on the received signal on said radio resource, correlates the power measurement with known codes and decides on the presence of other radio transmitters using said known codes. According to FIG. 12, sub pattern "A" is used by mobile device 202, sub pattern "B" by mobile device 203, sub pattern "C" by basestation 204 and sub pattern "D" by basestation 205. Subsequently, mobile device 200 selects one or several patterns from the set of allowed sub patterns, excluding those that have been detected in the previous step, for example, "E" and "F". Mobile device 200 then communicates the selected pattern or patterns to basestation 201. Using the received information from the device 200, basestation 201 decides on a sub pattern that it can allocate without causing undue interference to other devices using the shared radio resource, for example "E", and signals the selected sub pattern back to mobile device 200. The selected sub pattern may be allocated by basestation 201 for transmission, and by mobile device 200 for reception. Data transmission from basestation 201 to mobile device 200 may then commence on the shared radio resource using the agreed sub pattern.

Although the present invention and its advantages have been described in detail, it should be understood that various changes, substitutions and alterations can be made herein without departing from the spirit and scope of the invention as defined by the appended claims. For example, an embodiment of the invention is a computer readable medium containing executable instructions that perform, when executed by a programmable radio transceiver, the steps of detecting radio signals in the environment, determining using a correlation the TDD timeslot patterns used by transceivers in the environment, comparing the detected pattern to known allowable TDD timeslot patterns, determining whether one or more other radio transceivers is operating using a shared radio resource, and modifying the parameters of usage of the shared radio resource to avoid interference with the other transceivers.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising: receiving radio signals from a shared frequency spectrum; detecting time varying signal energy in the shared frequency spectrum; correlating the detected signal energy to predetermined patterns of time division duplex signals; determining from the correlation whether other apparatuses with radio transmitters are present; recovering timing information identifying the time division duplex signal patterns in use from the correlation; and selecting a time division duplex signal pattern for communication that reduces interference with the other apparatuses using the shared frequency spectrum.

2. The method of claim 1 further comprising: recovering timing information identifying the time division duplex signal patterns in use from the correlation; selecting a time division duplex signal pattern for reception that reduces interference by the other apparatuses using the shared frequency spectrum; and signaling said time division duplex pattern to another device to be allocated for communication.

3. The method of claim 1, further comprising: transmitting time division duplex signals on the shared frequency spectrum using the selected time division duplex signal pattern.

4. The method of claim 1 wherein selecting a time division duplex signal pattern further comprises: selecting a transmit power level.

5. The method of claim 1 wherein selecting a time division duplex signal pattern further comprises: selecting an uplink/ downlink pattern of time division duplex signals that minimizes the overlapping with the time division duplex uplink/downlink patterns of the other apparatuses.

6. An apparatus, comprising: a communications unit configured to receive time division duplex radio signals from a shared frequency spectrum; a processor configured to detect the time varying signal energy in said shared frequency spectrum; to correlate the detected time varying signal energy with predetermined time division duplex patterns; to determine from the correlation result whether another apparatus is using the shared frequency spectrum; and to select a time division duplex pattern for transferring radio signals on the shared frequency spectrum to reduce interference with one or more other apparatus.

7. The apparatus of claim 6, wherein the apparatus is a wireless communications element.

8. The apparatus of claim 6, wherein the apparatus is a base station.

9. The apparatus of claim 6, wherein the apparatus comprises an integrated circuit.

10. The apparatus of claim 6 wherein: the processor is further configured to store the predetermined patterns for time division duplex signaling on the shared frequency spectrum.

11. The apparatus of claim 6 wherein selecting a time division duplex pattern comprises selecting a pattern for uplink and downlink time division duplex signals.

12. The apparatus of claim 11 further comprising selection circuitry configured to select the pattern in a manner that avoids overlap with the time division duplex patterns in use by other apparatuses.

13. A method, comprising: receiving radio signals including time division duplex signals from a shared radio resource; detecting the time varying signal energy in the received radio signals; determining from the detected time varying signal energy that at least one of several predetermined patterns is correlated; determining from the correlation result whether a radio transmitter is using the shared radio resource; if a radio transmitter is using the shared radio resource, detecting the time division duplex pattern in use by the radio transmitter from the predetermined patterns; selecting a different time division duplex pattern from the predetermined patterns; and communicating to a second device the selected time division duplex pattern for future use in communications using the shared radio resource.

14. The method of claim 13, wherein receiving radio signals comprises: providing mobile user equipment having a radio transceiver and receiving signals in the radio transceiver.

15. The method of claim 14, wherein communicating to a second device comprises transmitting a radio signal to a wireless base station.

16. The method of claim 13 wherein the shared radio resource comprises a shared frequency spectrum.

17. The method of claim 13 wherein selecting a different time division duplex pattern comprises at least one of selecting a transmit power level for radio transmissions and selecting a pattern of uplink and downlink timeslots.

18. An integrated circuit, comprising: a radio transceiver configured to transmit and receive radio frequency signals using a shared frequency spectrum; a flexible spectrum usage controller configured to select at least one pattern for transmission of time division duplex radio signals from one of at least one predetermined set of permitted patterns; a radio signal transmission detector configured to detect the time varying signal energy in radio signals received by the radio transceiver from the shared frequency spectrum; a correlation function configured to determine the pattern used for time division duplex signals on the shared frequency spectrum by another radio transceiver; and storage configured to store the predetermined set of permitted patterns.

19. The integrated circuit of claim 18 wherein the integrated circuit is at least one of a portion of a wireless communication element, a base station, and mobile user equipment.

20. A computer readable non-transitory medium containing instructions that, when executed by a programmable radio transceiver configured to transmit time division duplex signals, perform the steps of: receiving radio signals from a shared frequency spectrum; detecting time varying signal energy in the shared frequency spectrum; correlating the detected signal energy to predetermined patterns of time division duplex signals; determining from the correlation whether radio transmitters are present using the shared frequency spectrum; recovering timing information identifying the time division duplex signal patterns in use from the correlation; and selecting a time division duplex signal pattern for communication that reduces interference with other apparatuses using the shared frequency spectrum.

* * * * *